United States Patent
Miyoshi et al.

(10) Patent No.: US 7,249,498 B2
(45) Date of Patent: Jul. 31, 2007

(54) SYSTEM AND METHOD FOR DETERMINING TIRE FORCE

(75) Inventors: Akihiro Miyoshi, Kobe (JP); Tamio Tsurita, Osaka (JP); Miwa Kunii, Osaka (JP)

(73) Assignees: Sumitomo Rubber Industries, Ltd., Kobe-shi (JP); Sumitomo Electric Industries, Ltd., Osaka-shi (JP)

( * ) Notice: Subject to any disclaimer, the term of this patent is extended or adjusted under 35 U.S.C. 154(b) by 68 days.

(21) Appl. No.: 10/967,292

(22) Filed: Oct. 19, 2004

(65) Prior Publication Data
US 2005/0103100 A1 May 19, 2005

(30) Foreign Application Priority Data
Oct. 27, 2003 (JP) .............................. 2003-366299
Jul. 26, 2004 (JP) .............................. 2004-217088

(51) Int. Cl.
*E01C 23/00* (2006.01)
(52) U.S. Cl. ........................................................ 73/146
(58) Field of Classification Search .................. 73/146
See application file for complete search history.

(56) References Cited

U.S. PATENT DOCUMENTS

| | | | | |
|---|---|---|---|---|
| 3,718,040 A | * | 2/1973 | Freeman et al. | 73/146 |
| 5,099,613 A | * | 3/1992 | Rogers, Jr. | 451/24 |
| 5,838,229 A | * | 11/1998 | Robinson, III | 340/442 |
| 6,523,408 B1 | * | 2/2003 | Colarelli et al. | 73/460 |
| 6,756,892 B2 | * | 6/2004 | Konchin et al. | 340/447 |
| 2005/0000278 A1 | * | 1/2005 | Haralampu et al. | 73/146 |

FOREIGN PATENT DOCUMENTS

| | | |
|---|---|---|
| JP | 2002-36836 A | 2/2002 |
| JP | 2002-87032 A | 3/2002 |
| JP | 2002-331813 A | 11/2002 |

* cited by examiner

*Primary Examiner*—Max Noori
(74) *Attorney, Agent, or Firm*—Birch, Stewart, Kolasch & Birch, LLP

(57) ABSTRACT

A system and method for determining the magnitude of a force acting on a tire are disclosed. Further, a sensor and a tire suitable for use in the system and method are also disclosed. The system comprises: a tire strain sensor mounted on the tire, for detecting a tire strain at the mounted position, and generating data representing tire strain; a sensor locator for locating the sensor on the tire; a memory in which data on the relationship between the tire strain and force acting on the tire at each of measuring points are stored; and a processor computing the magnitude of the force, using the data representing tire strain obtained from the tire strain sensor and the data on the relationship acquired from the memory based on the data on the sensor location obtained from the sensor locator. The method comprises: obtaining data on tire strain from a tire strain sensor mounted on the tire; locating the tire strain sensor, to obtain data on the position of the tire strain sensor; obtaining data on a relationship between the tire strain and the force at the located position of the tire strain sensor, from previously stored data on relationships between the tire strain and force at a plurality of sensor positions; and computing the force using the obtained data on the tire strain and the obtained data on the relationship between the tire strain and the force.

11 Claims, 13 Drawing Sheets

FIG.10
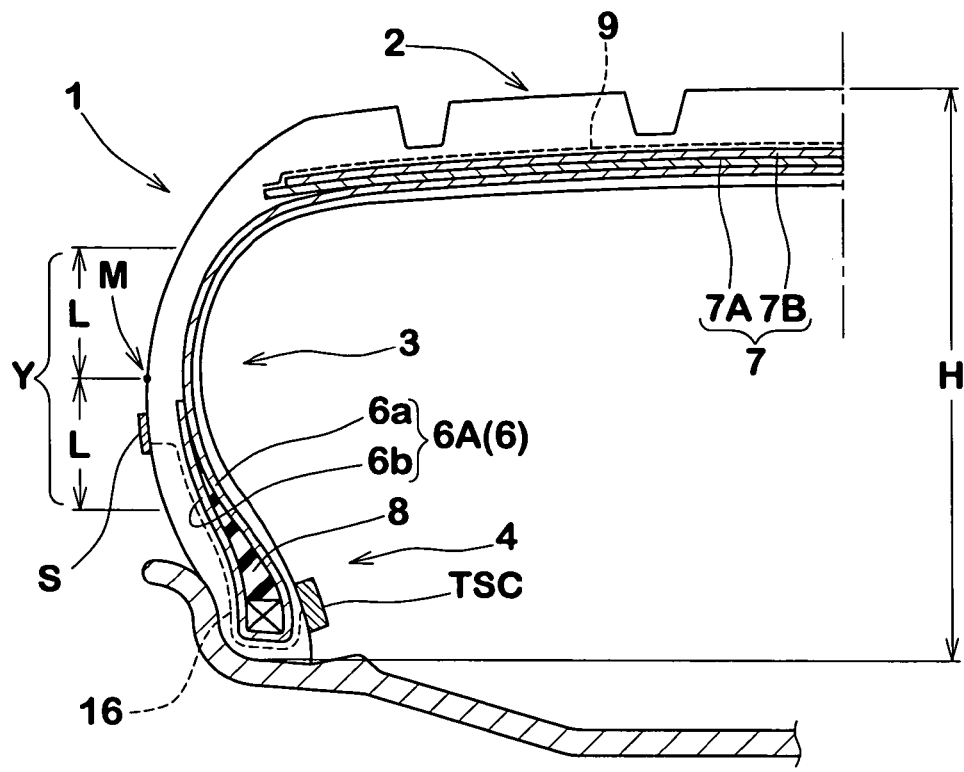
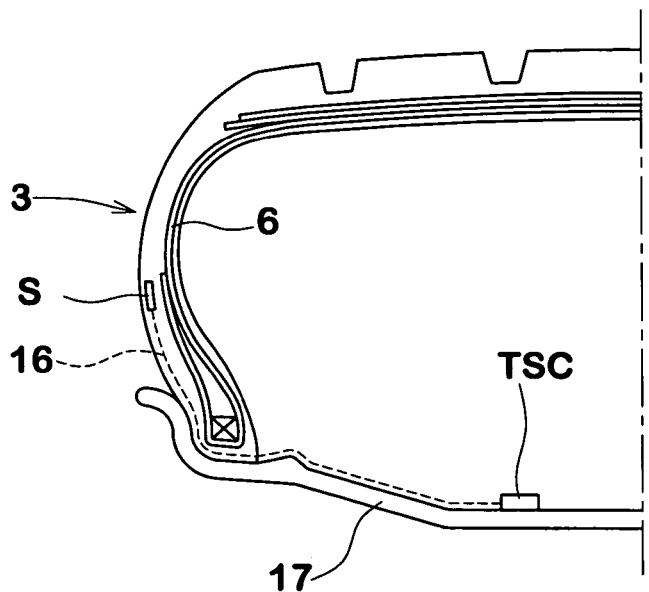
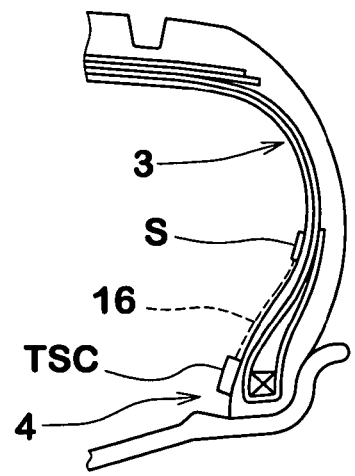
FIG.11      FIG.12

Measuring point arrangement

Sensor arrangement

SYSTEM AND METHOD FOR DETERMINING TIRE FORCE

This Non-provisional application claims priority under 35 U.S.C. § 119(a) on Patent Application No(s). 2003-366299 and 2004-217088 filed in Japan on Oct. 27, 2003 and Jul. 26, 2004 respectively, the entire contents of which are hereby incorporated by reference.

The present invention relates to a system and method for determining tire force acting on a vehicle tire.

In recent years, the number of vehicles equipped with computer-aided vehicle control systems (CAVCS) such as anti-lock brake system, traction control system, vehicle stability control system, attitude control system, suspension control system and steer-by-wire system is rising.

In such control systems (CAVCS), if data on the magnitude and direction of the force acting on a rolling tire can be utilized, control accuracy will be dramatically improved. Hitherto, however, there is no way to get data on the forces acting on rolling tires during running. In the car industry, therefore, there is a great demand for a device which can monitor the forces acting on vehicle tire during running.

A primary object of the present invention is therefore, to provide a system and method by which a force acting on a vehicle tire during running can be easily determined.

Another object of the present invention is to provide a strain sensor durable against large deformation and suitable for use on a tire.

Still another object of the present invention is to provide a pneumatic tire provided with a strain sensor durable against large tire deformation.

According to one aspect of the present invention, a system for determining the magnitude of a force acting on a tire, comprises:

a tire strain sensor mounted on the tire, for detecting a tire strain at the mounted position, and generating data representing tire strain;

a sensor locator for locating the sensor on the tire;

a memory in which data on the relationship between the tire strain and force acting on the tire at each of measuring points are stored; and a processor computing the magnitude of the force, using the data representing tire strain obtained from the tire strain sensor and the data on the relationship acquired from the memory based on the data on the sensor location obtained from the sensor locator.

According to another aspect of the present invention, a method of determining the magnitude of a force acting on a tire comprises:

obtaining data on tire strain from a tire strain sensor mounted on the tire; locating the tire strain sensor, to obtain data on the position of the tire strain sensor;

obtaining data on a relationship between the tire strain and the force at the located position of the tire strain sensor, from previously stored data on relationships between the tire strain and force at a plurality of sensor positions; and computing the force using the obtained data on the tire strain and the obtained data on the relationship between the tire strain and the force.

Embodiments of the present invention will now be described in detail in conjunction with the accompanying drawings, in which.

Figure 4A:
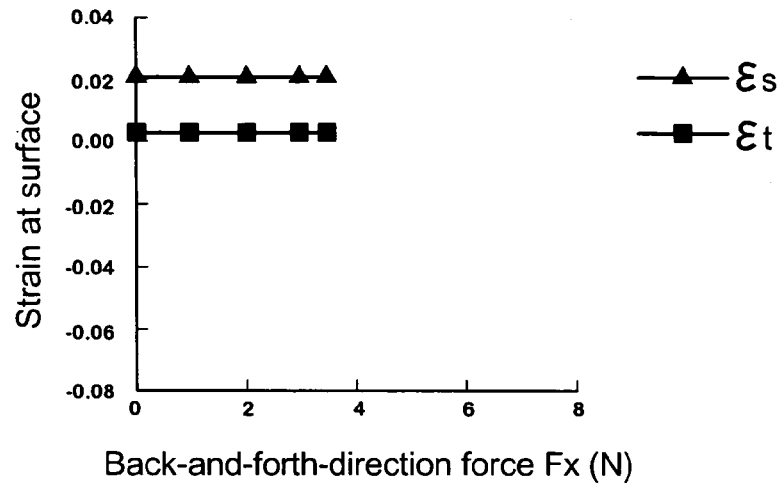
Figure 4B:
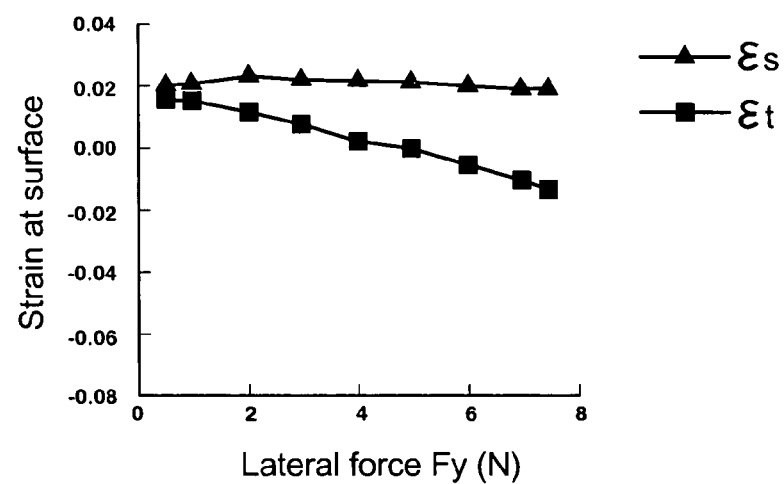
Figure 4C:
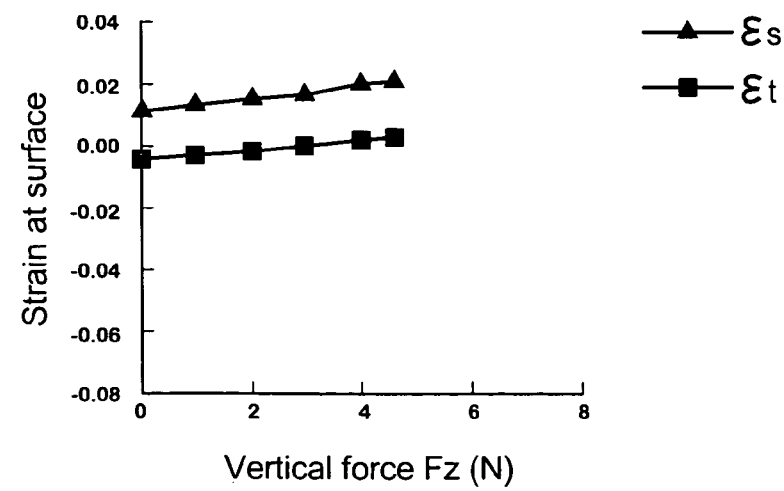
Figure 5A:
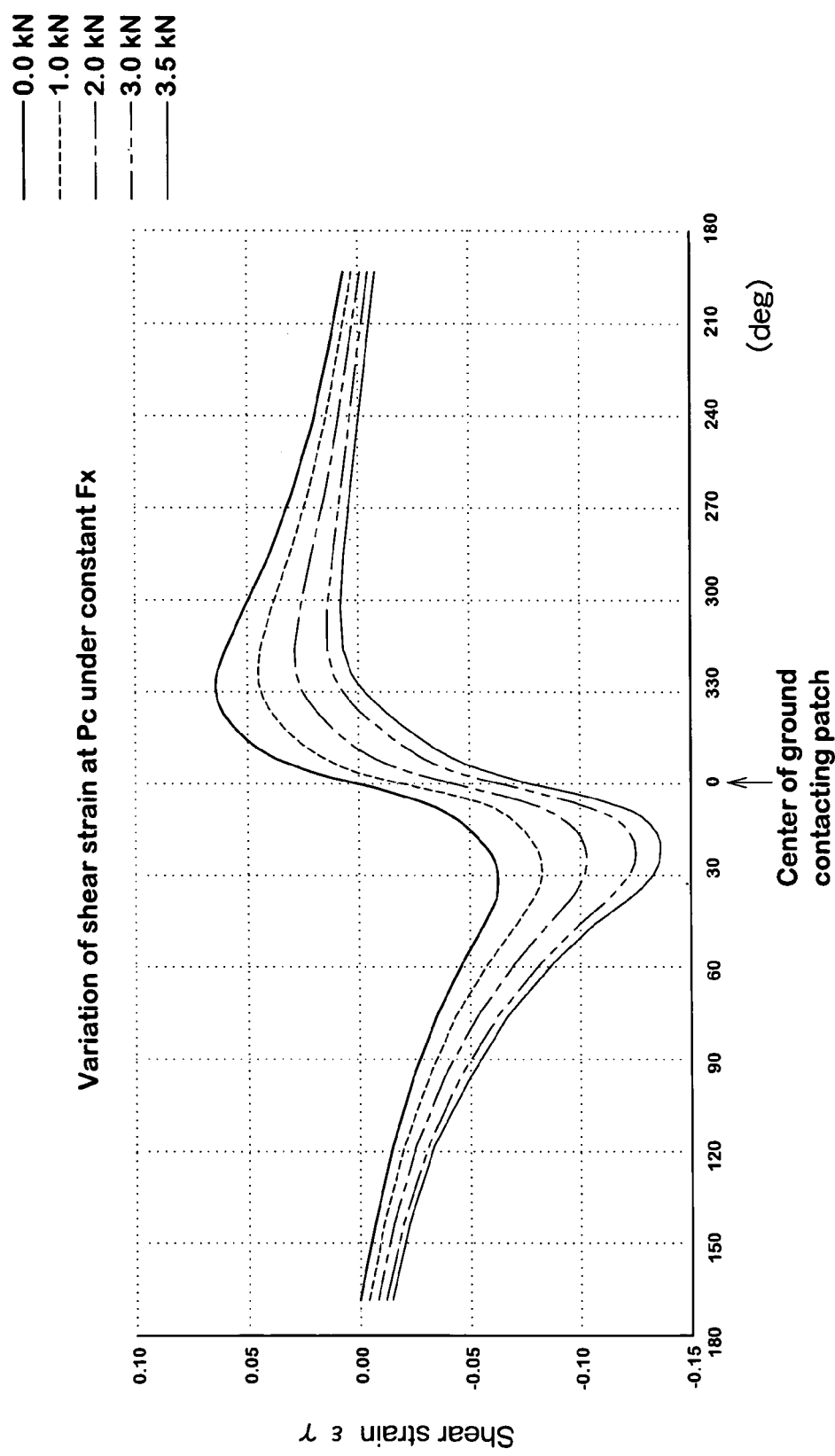
Figure 5B:
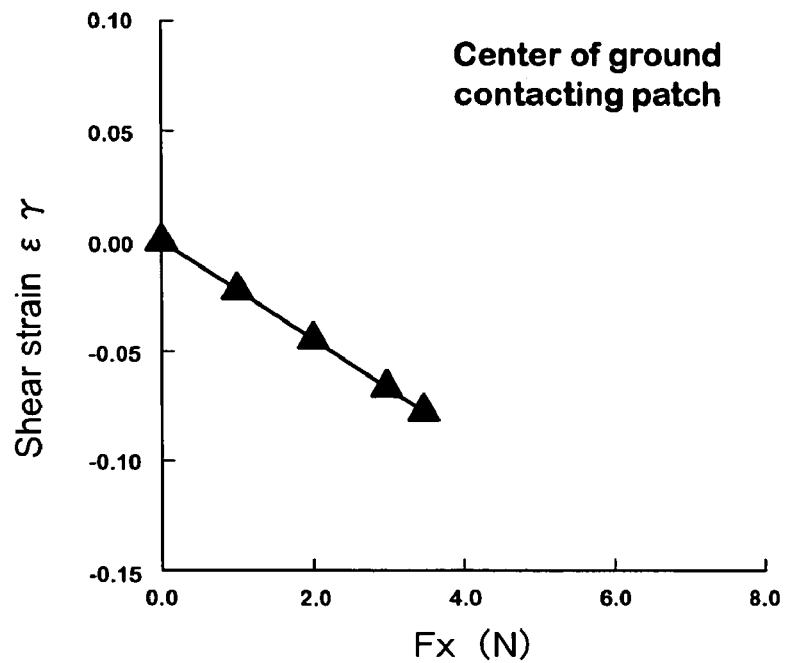
Figure 6:
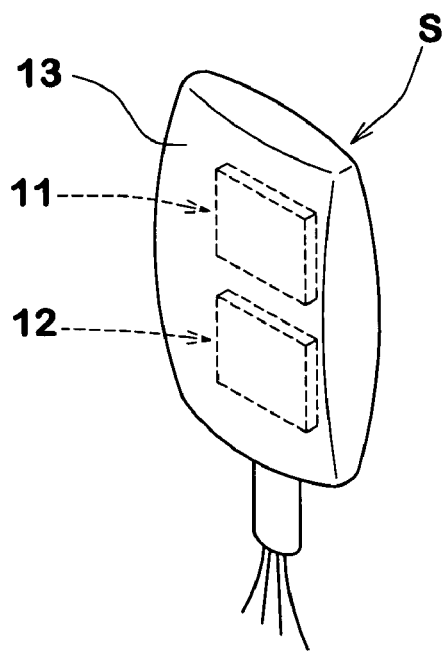
Figure 7:
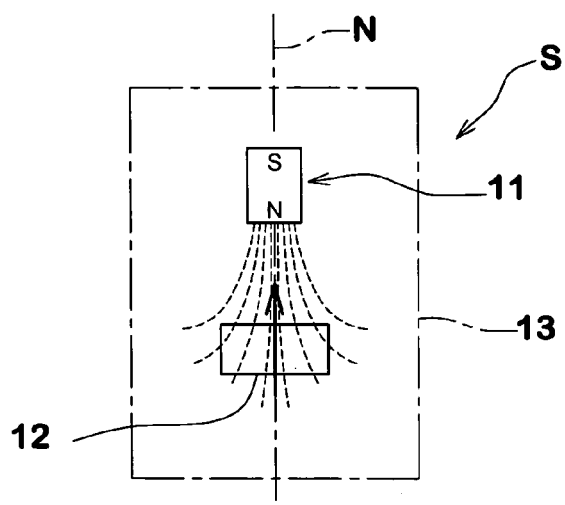
Figure 8:
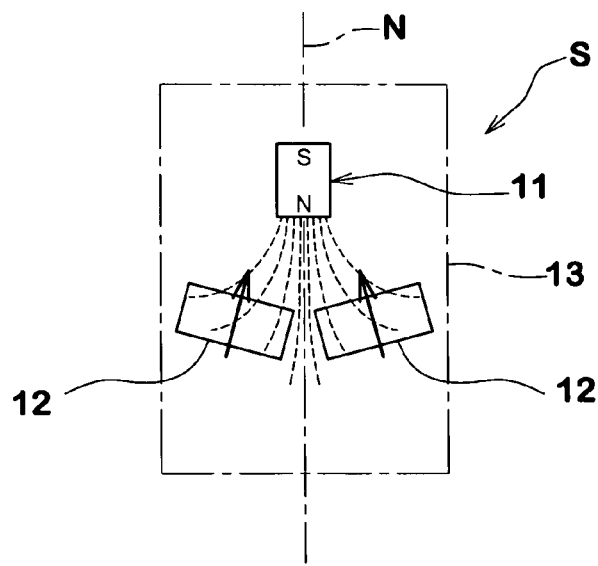
Figure 9:
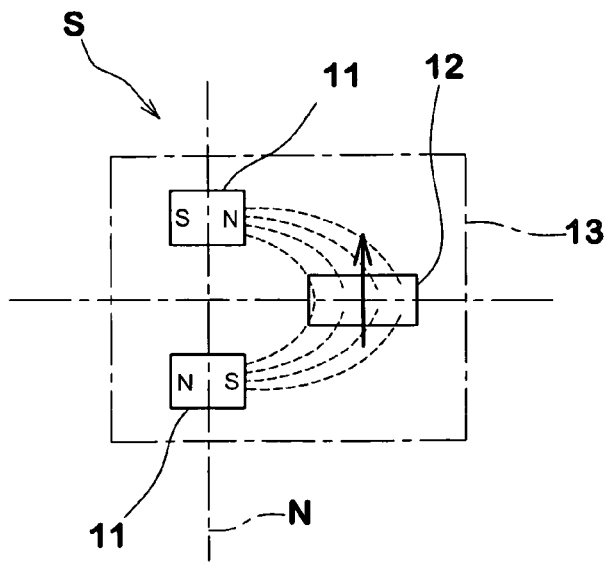
Figure 13:
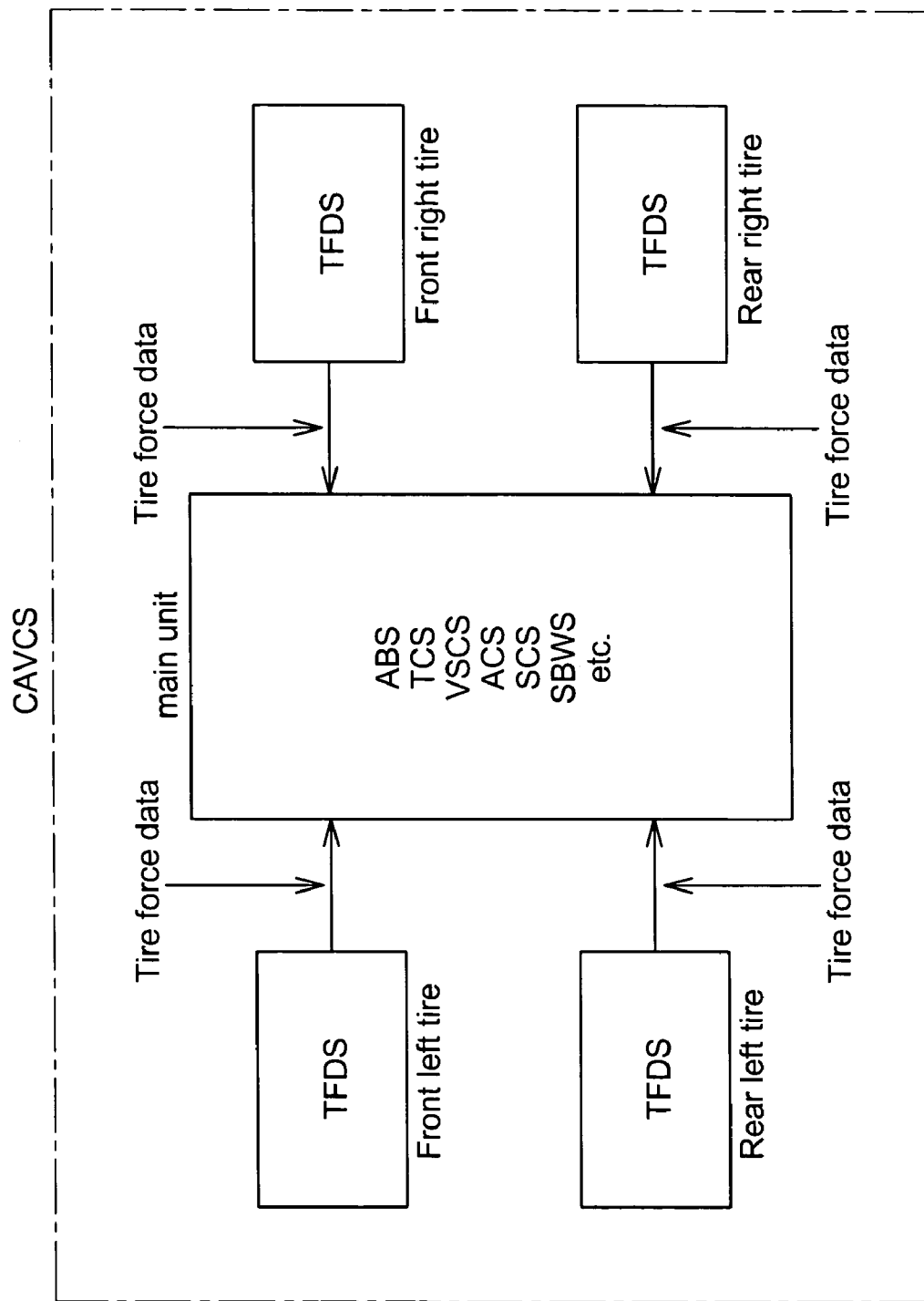
Figure 14:
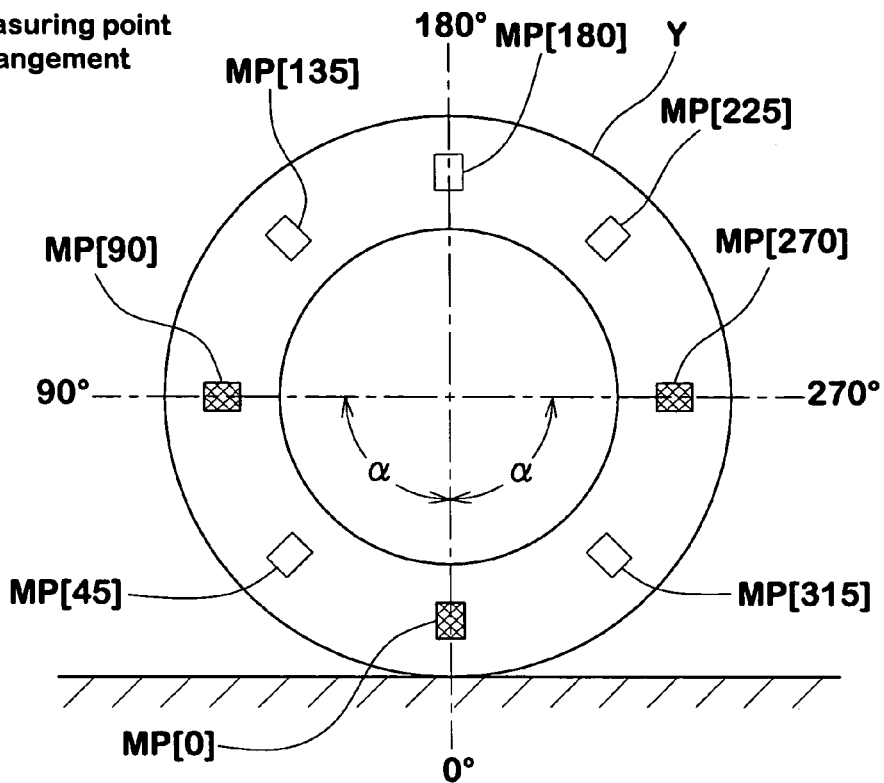
Figure 15:
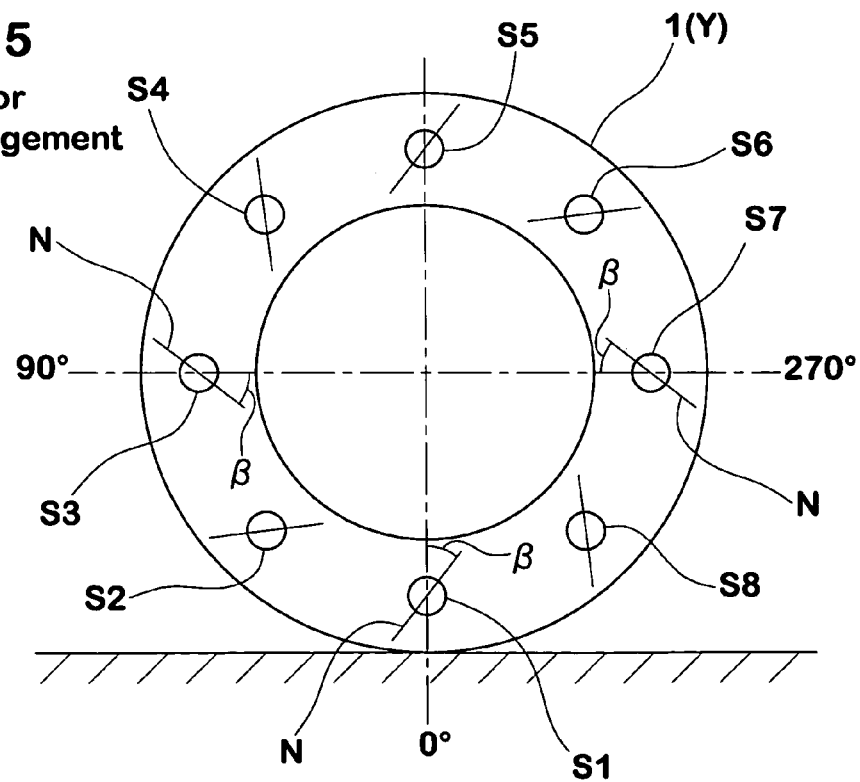
Figure 16:
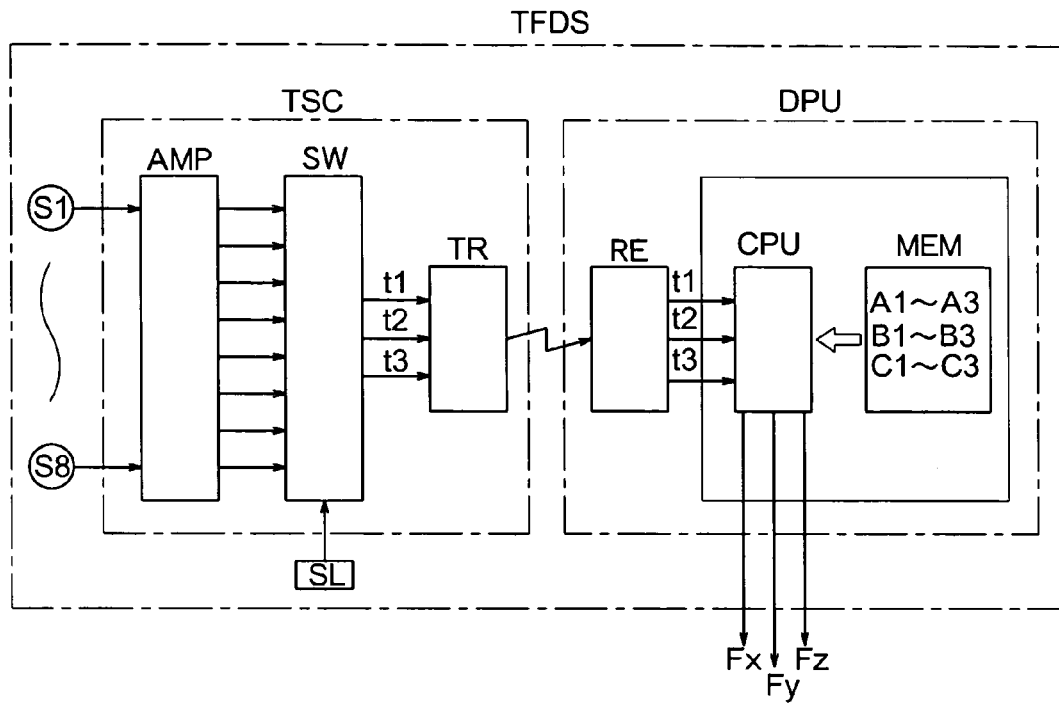
Figure 17:
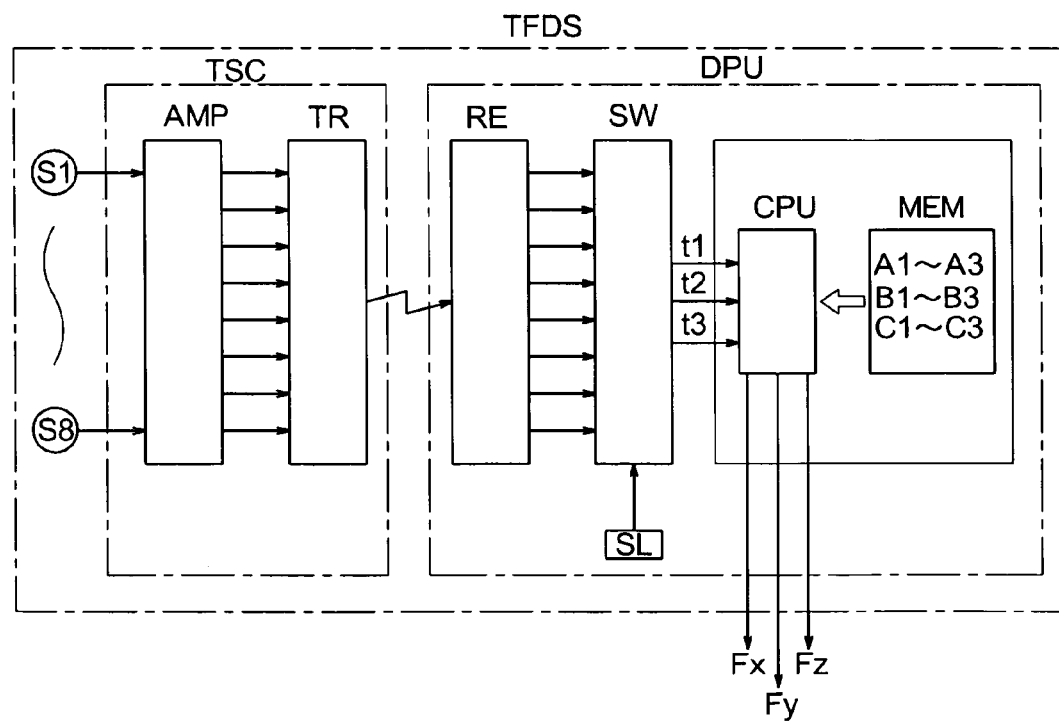
Figure 18:
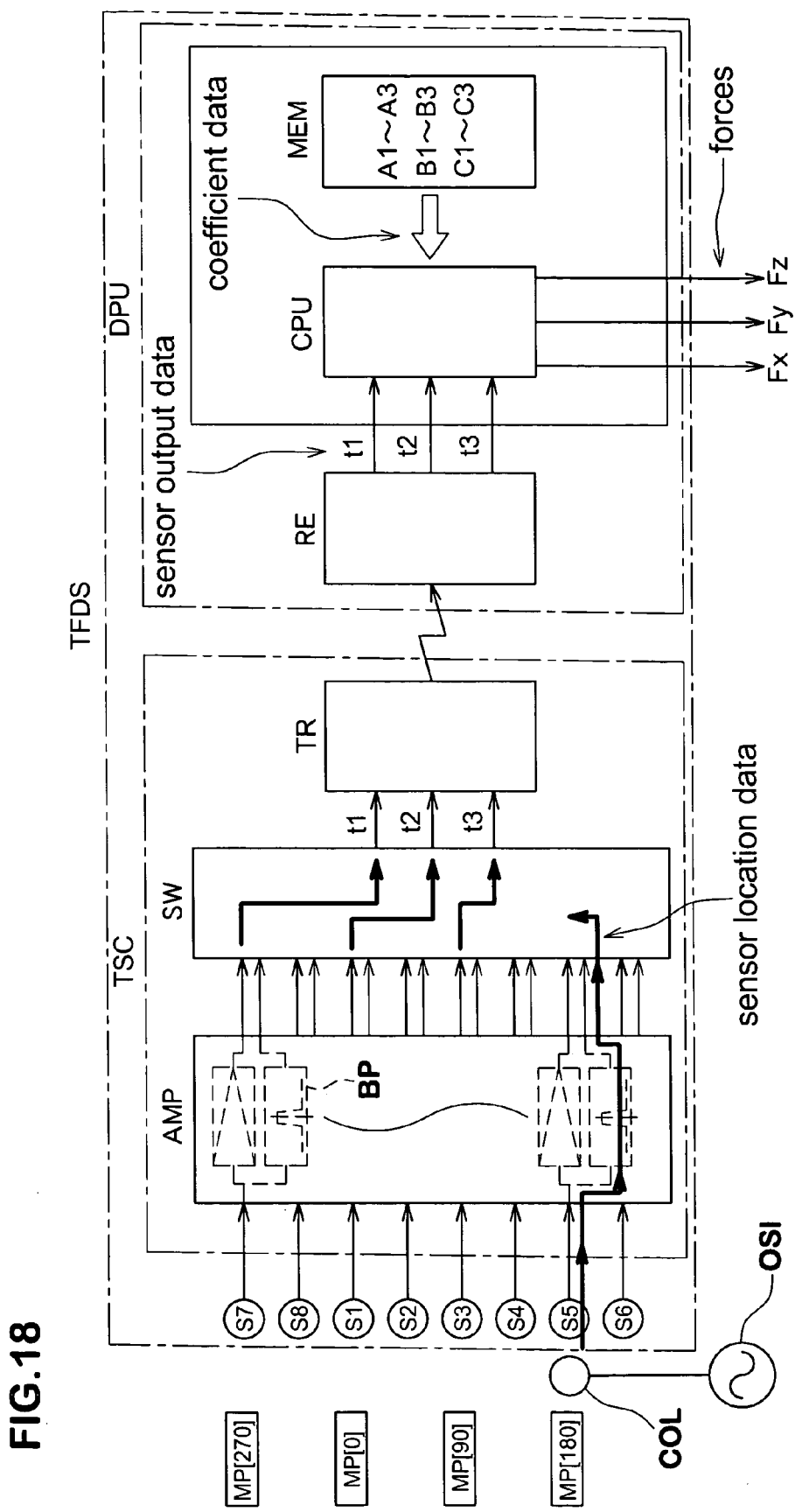
Figure 19:
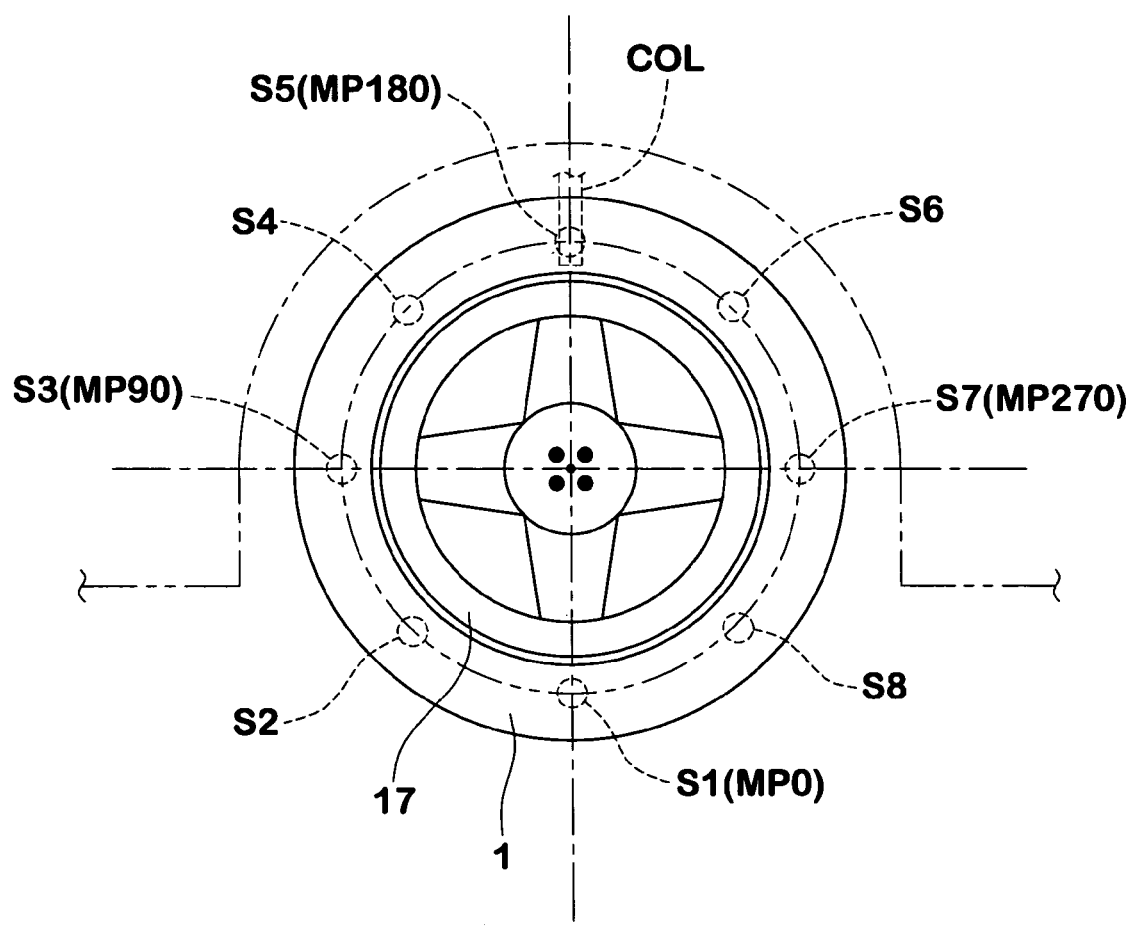
Figure 20:
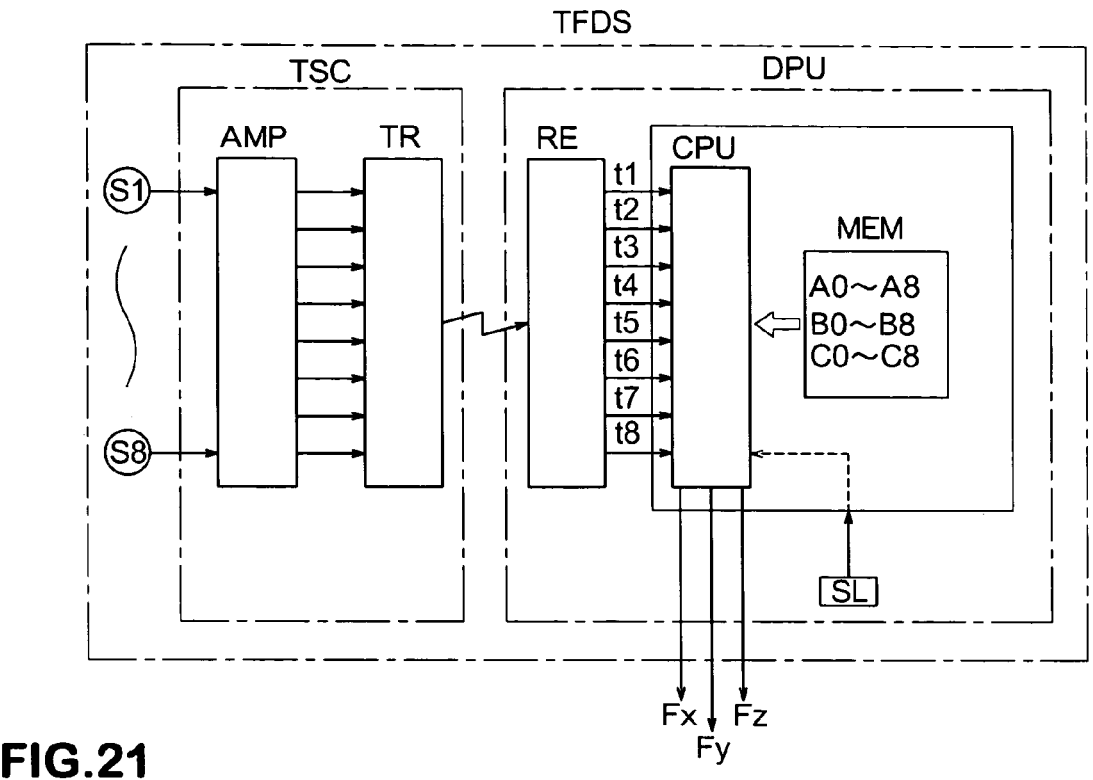
Figure 21:
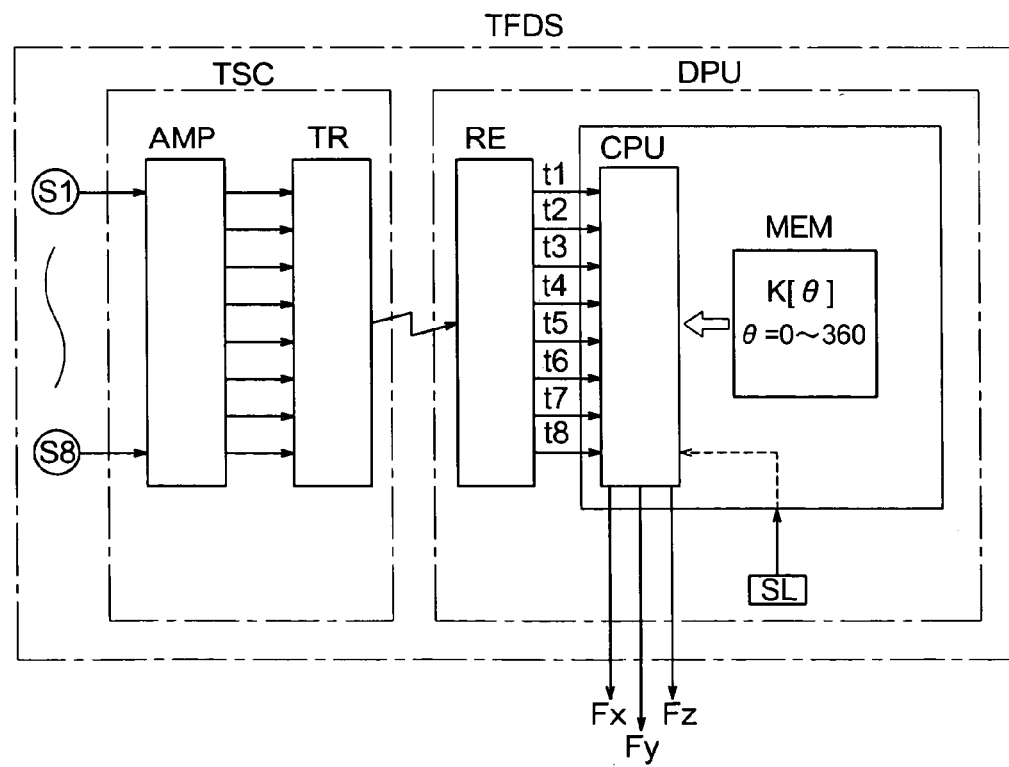

FIGS. 4(a), 4(b) and 4(c) are graphs each showing a radial strain ∈s and circumferential strain ∈t as a function of a force Fx, Fy or Fz;

FIG. 5(a) is a graph showing a shear strain as a function of a measuring position (degree around the tire rotational axis);

FIG. 5(b) is a graph showing a shear strain at zero-degree position as a function of a force Fx;

FIG. 6 is a schematic perspective view of a tire strain sensor according to the present invention;

FIGS. 7, 8 and 9 each show a magnet and sensor element arrangement for the tire strain sensor;

FIG. 10 is a cross sectional view of a pneumatic tire showing a sensor position and also showing a typical structure of a passenger car radial tire;

FIGS. 11 and 12 are cross sectional views each showing another sensor position;

FIG. 13 is a diagram showing a computer-aided vehicle control systems (CAVCS) according to the present invention;

FIG. 14 is a diagram for explaining the measuring points;

FIG. 15 is a diagram for explaining a sensor arrangement;

FIGS. 16, 17 and 18 are diagrams each showing a tire force determining system (TFDS) according to the present invention;

FIG. 19 shows the arrangement of the sensors and the arrangement of the measuring points and induction coil COL used in the example shown in FIG. 18; and FIGS. 20 and 21 are diagrams each showing a further example of the tire force determining system (TFDS) according to the present invention.

BASIC PRINCIPLES

Figure 1:
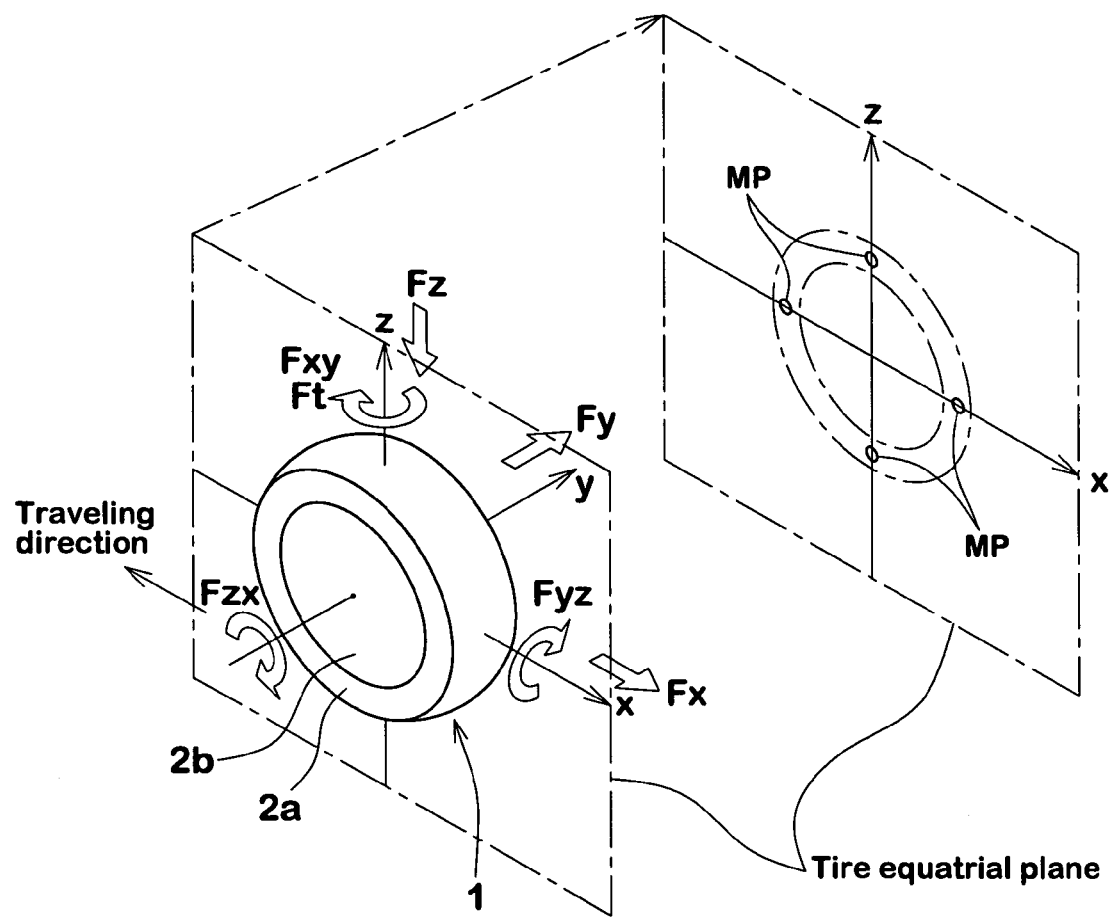
FIG. 1 is a schematic perspective view of a tire for explaining various forces acting on a tire and the coordinate system used to express the measuring position.

FIG. 1 shows various forces acting on a rolling tire: a force in the back-and-forth-direction x (hereinafter back-and-forth-direction force Fx); a force in the lateral direction y (hereinafter lateral force Fy); a force in the vertical direction z (hereinafter vertical force Fz); and a force Fyz, Fzx, Fxy around an axis x, y, z passing the center of the tire in each of the above-mentioned three directions.

As far as there is a linear correlation or almost linear correlation between an applied force and the resultant tire strain or stress (hereinafter, simply referred as tire strain), there is a possibility of determining the various forces by the use of measured tire strains.

Taking forces Fx, Fy and Fz in three translational motion directions as an example, the tire strain will be explained.

Figure 2:
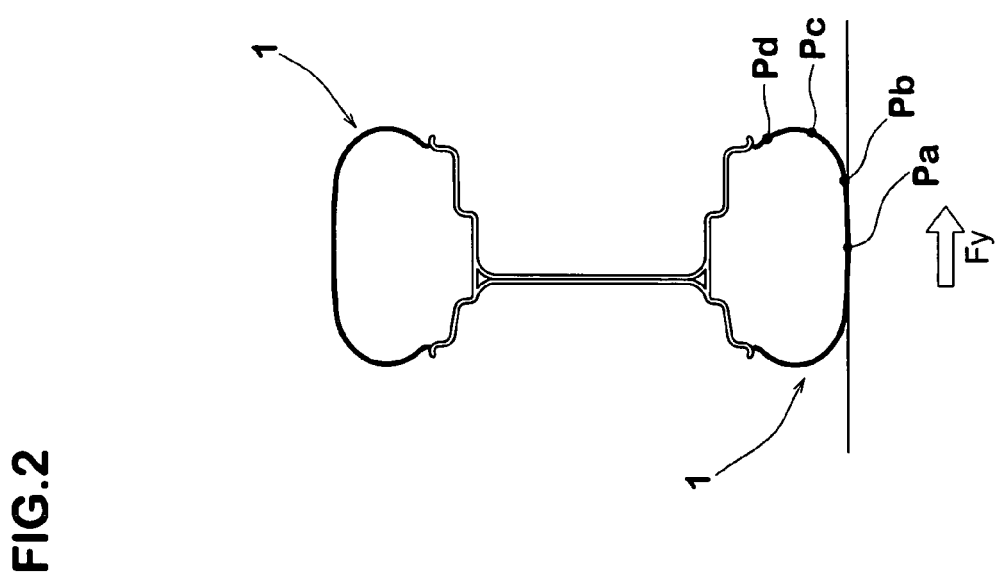
FIG. 2 and FIG. 3 are a schematic cross sectional view of a pneumatic tire and a side view of the tire, respectively, for explaining relationships between tire forces and measuring positions.
Figure 3:
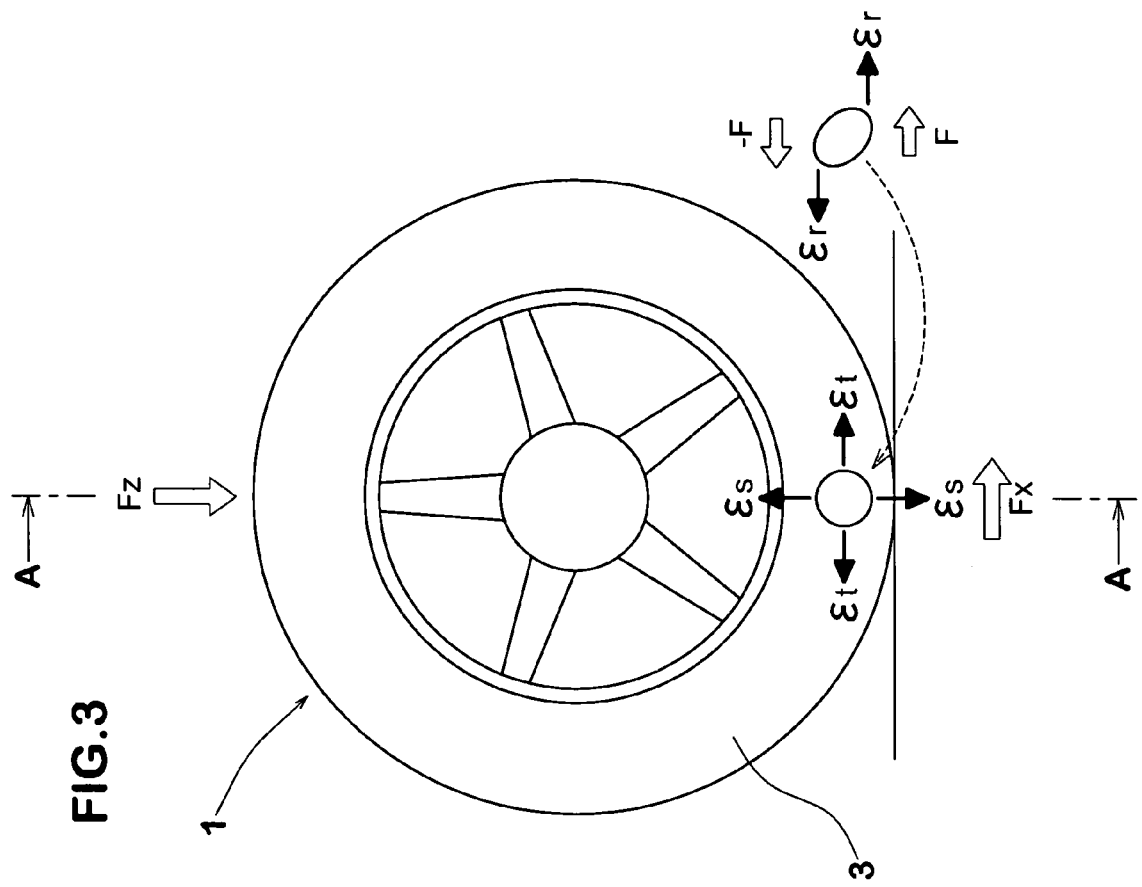

As shown in FIG. 2 and FIG. 3, in the circumferential center of the ground contacting patch of a tire, with respect to four measuring positions Pa, Pb, Pc and Pd of a pneumatic tire 1 (Pa at the tire equator, Pb at the tread edge, Pc in the sidewall portion and Pd in the bead portion), the strain ∈s in the radial direction and the strain ∈t in the circumferential direction were measured at the tire outer surface, applying to the tire a back-and-forth-direction force Fx or lateral force Fy or vertical force Fz by turns.

The results are shown in the following Table 1.

TABLE 1

| | Measuring position | | | |
|---|---|---|---|---|
| | Pa | Pb | Pc | Pd |
| Correlation with Fx | | | | |
| $\epsilon s$ | D | C | D | D |
| $\epsilon t$ | C | C | B | D |
| Correlation with Fy | | | | |
| $\epsilon s$ | C | D | D | B |
| $\epsilon t$ | D | C | A | D |
| Correlation with Fz | | | | |
| $\epsilon s$ | C | D | B | B |
| $\epsilon t$ | C | D | B | D |

A: linear, large variation
B: linear, small variation
C: nonlinear, small variation
D: absent At the positions Pa and Pb in the tread portion, each strain $\epsilon s$, $\epsilon t$ has substantially no correlation or a small nonlinear correlation with the forces Fx, Fy and Fz. Thus, it is very difficult or almost impossible to determine the forces Fx, Fy and Fz from the strains at the positions Pa and Pb.

At the position Pd in the bead portion, the strain $\epsilon s$ in the radial direction has a linear correlation with each of the lateral force Fy and vertical force Fz, but the strains $\epsilon s$ and $\epsilon t$ each have no correlation with the back-and-forth-direction force Fx. Therefore, it is almost impossible to know all the forces Fx, Fy and Fz from the strains at the position Pd.

On the other hand, at the position Pc in the sidewall portion, at least one of the strains $\epsilon s$ and $\epsilon t$ has a linear correlation with each of the three translational forces Fx, Fy and Fz.

Therefore, there is a possibility that the strains measured at the position Pc can be used to determine the three translational forces Fx, Fy and Fz in order to know the state of a rolling tire.

FIGS. 4(a), 4(b) and 4(c) show the radial and circumferential strains $\epsilon s$ and $\epsilon t$ at the position Pc as a function of the forces Fx, Fy and Fz, respectively. As shown in FIG. 4(a), although the back-and-forth-direction force Fx and strain $\epsilon t$ show a linear correlation, the variation is so small to make accurate determination of the force.

Therefore, the present inventors explored a possibility of utilizing another parameter instead of the radial and circumferential strains, and confirmed that a shear strain or shearing stress (hereinafter simply shear strain $\epsilon \gamma$ or strain $\epsilon \gamma$) is suitable for determining the tire forces.

For example, FIG. 5(a) shows the variation of the shear strain $\epsilon \gamma$ measured at a fixed point on the outer surface of a tire at the above-mentioned position Pc during rotating the tire while applying a constant force Fx. The measurement was made changing Fx from 0 to 3.5 kN. The strain $\epsilon \gamma$ has a linear or almost linear correlation with Fx for example as shown in FIG. 5(b) which shows the shear strain $\epsilon \gamma$ at 0 degree (6 o'clock position) as a function of Fx.

Further, it was also confirmed that the shear strain $\epsilon \gamma$ has a relatively large and linear or almost linear correlation with each of the forces Fy and Fz as well although the detailed discussion is omitted here.

AS to the tire strain as being the measuring parameter to determine the forces Fx, Fy and Fz, the shear strain $\epsilon \gamma$ at a position Pc in the sidewall portion is used in this embodiment to improve the accuracy.

<Strain Sensor>

AS the tire deformation repeated during running becomes very large in the sidewall portion 3, a conventional wire resistance strain gauge is very liable to be broken. Thus, it is problematic in view of durability. Therefore, the strain sensor S has to be durable against the repeated large deformation and preferably has an ability to follow the deformation.

In this invention, therefore, a new type of strain sensor S was thought up.

AS shown in FIGS. 6, 7, 8 and 9, the strain sensor S is made up of at least one magnet 11, at least one magnetometric sensor element 12 disposed in the magnetic flux of the magnet 11 and a spacer 13 therebetween.

For the magnetometric sensor element 12, semiconductor magnetometric sensor elements such as hall element and magnetoresistance element (MR) can be used. Preferably, a hall element is used for the sensitivity and stability.

For precision and also convenience in handling, the magnet(s) 11 and sensor element(s) 12 are embedded in a resilient material as a solid electronic part while leaving a space therebetween. In this case, therefore, the resilient material filling the space functions as the above-mentioned spacer 13.

It is important for the strain sensor S to make an elastic deformation following the deformation of the sidewall portion 3. Therefore, as the resilient material 13, various rubbery materials which is preferably not harder than the sidewall rubber to which the strain sensor S is attached can be used. For example, thermoplastic elastomers (TPE) suitable for casting and injection molding are preferably used.

When the strain sensor S is formed as a solid electronic part by molding or the like, it is preferable that the surface thereof is roughened or treated to improve bonding to the tire rubber. As a further modification, in case of the sensor to be embedded in the tire sidewall portion during tire vulcanization, the sidewall rubber itself may be used as the above-mentioned resilient material into which the magnet(s) 11 and sensor element(s) 12 are embedded.

When the strain sensor S is deformed under stress, the relative location between the magnet(s) 11 and magnetometric sensor element 12 is changed and accordingly the flux at the magnetometric sensor elements 12 is also changed. Thus, the magnetometric sensor element 12 can generate an analog output corresponding to the variation of the flux or the strain.

Three examples of the magnet and sensor element arrangement are shown in FIGS. 7 to 9.

In FIG. 7, the sensor S is made up of a single magnetometric sensor element 12 and a single magnet 11. The sensor element 12 and magnet 11 are arranged in line such that the element 12 faces towards a N (or S) pole of the magnet 11. In this example, the direction of the center line on which the element 12 and magnet 11 are aligned becomes the most sensitive direction N.

If the sensor element 12 has no directivity with respect to a direction around the above-mentioned sensitive direction N, and further the magnetic flux density is substantially constant in the direction around the direction N, then the sensor S as whole has no directivity with respect to the direction around the most sensitive direction N.

However, if the sensitivity of the sensor element 12 or the magnetic flux density has a directivity, there is a possibility that the sensor has a directivity with respect to the direction around direction N. In such as a case, the directivity is oriented to the tire circumferential direction.

In general, the density of the magnetic flux is almost constant near the center line of the magnet 11. Accordingly, if the sensor element 12 is made a small parallel displacement or tilt relatively to the magnet 11, as the variation of the magnetic flux density at the sensor element is small, there is a tendency for the sensitivity to become low. To improve the sensitivity, the sensor element 12 can be disposed off the center line of the magnet 11 to avoid the almost constant flux zone.

FIG. 8 shows such example, wherein the sensor S is made up of a single magnet 11 and a plurality of (e.g. two) magnetometric sensor elements 12 disposed off the center line (N) of the magnet 11. In this example, two sensor elements 12 and one magnet 11 are disposed on a plane such that the two sensor elements 12 are disposed one on each side of the center line (N) symmetrically about the center line (N), and the sensor elements 12 are inclined to orient towards one pole N (or S). In this example, the variation of flux due to strain at one of the elements 12 occurs inversely to that at the other element 12.

Therefore, the difference between the analog outputs of the two elements 12 is used as the output of the sensor S. Accordingly, the output level becomes twice of one element and further increased by the off-center arrangement, namely the sensitivity is effectively increased with respect to the strain in the above-mentioned plane. Further, as a result of the increase in the sensitivity in the above-mentioned plane, the sensitivity in a perpendicular plane relatively decreases. Thus, the sensor S as whole has such a directivity in the direction around the most sensitive direction N.

Furthermore, FIG. 9 shows another example wherein, a single magnetometric sensor element 12 and a plurality of (e.g. two) magnets 11 are arranged on a plane. The sensor element 12 is disposed on the axis of symmetry about which two magnets 11 are disposed symmetrically. With respect to the positions of the NS poles, the two magnets 11 are reversed. The sensor element 12 is oriented perpendicularly to the axis of symmetry. In this example too, the sensitivity in the above-mentioned plane is increased, and as a result, the sensitivity in a perpendicular plane relatively decreases. Thus, the sensor S as whole has such a directivity.

<Sensor Orientation>

As explained above, the strain sensor S has the most sensitive direction N.

In order to sense the shear strain component ($\in\gamma$) of the tire strain $\in$ in the sidewall portion 3, the strain sensor S is oriented such that the most sensitive direction N inclines at an angle (beta) in a range of from 10 to 80 degrees, preferably 20 to 70 degrees, more preferably 30 to 60 degrees, still more preferably 40 to 50 degrees with respect to the tire radial direction.

Further, when the directivity of the sensor S around the axis in the most sensitive direction N shows a specific direction, the sensor S has to be oriented so that the sensitivity to the shear in the circumferential direction becomes maximum.

<Sensor Zone>

The above-mentioned position Pc has to be within a circumferentially extending annular zone Y which extends radially outwardly and inwardly from the center M of the tire sectional height H by a radial distance L of at most 25%, preferably less than 20%, more preferably less than 15% of the tire sectional height H as shown in FIG. 10.

In this zone Y, the measuring points MP for which strain sensors S are disposed are provided (thus, hereinafter, sensor zone Y).

<Measuring Points>

The number (m) of the measuring points MP has to equal to or more than the number (n) of forces F to seek.

In this embodiment, the forces are Fx, Fy and Fz in three translational motion directions x, y and z. Therefore, three or more measuring points MP are provided at different circumferential positions around the rotational axis of the tire.

As to the circumferential positions of the measuring points MP, in view of the data processing following the measurements, it is preferable that the measuring point MP are arranged symmetrically about a straight line (for example z-axis or vertical axis) passing through the tire rotational axis or equiangularly around the tire rotational axis.

AS to the radial positions of the measuring points MP, usually they are disposed on the circumference of a circle having the center on the tire rotational axis. In other words, they are disposed at the same radial distance from the tire rotational axis. However, this does not mean to exclude that the measuring points MP are disposed at different radial positions. For example, such a combination of the regularly arranged measuring points MP for the forces Fx, Fy ad Fz and an irregularly arranged sensor for another force or parameter is possible.

The sensors S are for example, disposed at a radial position between the center M and 15% radially inwardly therefrom.

<Pneumatic Tire>

Incidentally, the tire 1, a pneumatic tire comprises a tread portion 2, a pair of axially spaced bead portions 4 each with a bead core 5 therein, a pair of sidewall portions 3 extending between the tread edges and the bead portions, and a carcass 6 extending between the bead portions 4, a belt 7 disposed radially outside the carcass 6 in the tread portion 2.

In this embodiment, the tire 1 is a radial ply tire for passenger cars.

The carcass 6 comprises at least one ply 6A of cords arranged radially at an angle of 90 to 70 degrees with respect to the tire equator, and extending between the bead portions 4 through the tread portion 2 and sidewall portions 3, and turned up around the bead core 5 in each bead portion 4 from the inside to the outside of the tire so as to form a pair of turned up portions 6b and one main portion 6a therebetween.

Between the main portion 6a and turned up portion 6b of the carcass ply 6A in each bead portion, there is disposed a bead apex made of hard rubber extending radially outwards from the radially outside of the bead core, while tapering towards its radially outer end to reinforce the bead portion.

The belt comprises a breaker 7 and optionally a band 9 on the radially outside of the breaker.

The breaker 7 is disposed on the crown portion of the carcass and extends almost allover the tread width, and comprises at least two cross plies, a radially inner ply 7A and a radially outer ply 7B, each made of cords laid parallel with each other at an angle of from 10 to 35 degrees with respect to the tire equator so that the cords in one ply cross the cords in the other ply.

The band 9 is disposed on the radially outside of the breaker 7 and made of at least one cord wound at almost zero angle or a small angle of less than 5 degrees with respect to the circumferential direction of the tire.

<Sensor Mounting Position>

On the other hand, in view of the sensibility to the tire strain, it is preferable that the strain sensors S are disposed on or in the outer surface of the sidewall portion 3 as shown in FIG. 10. Further, as shown in FIG. 11, the strain sensors S can be disposed within the sidewall portion 3, for example, on the axially outside of the reinforcing cord layer inclusive of the carcass 6. Furthermore, it may be possible to dispose the sensor S on the inner surface of the sidewall portion 3 as shown in FIG. 12. In any case, it is preferable to the use of adhesive agent that the strain sensors S are placed on the outer or inner surface or within the sidewall portion 3 before tire vulcanization and are bonded chemically and/or mechanically during vulcanization.

<Tire Force Determining System>

Next a tire force determining system TFDS according to the present invention is explained.

FIG. 13 shows a diagram of a computer-aided vehicle control systems CAVCS according to the present invention. This CAVCS includes the tire force determining system TFDS on each of the four tires, and, as the main unit, at least one of anti-lock brake system (ABS), traction control system (TCS), vehicle stability control system (VSCS), attitude control system (ACS), suspension control system (SCS), steer-by-wire system (SBWS) and the like is included.

The tire force determining system TFDS comprises:

one or more tire strain sensors S disposed on a tire;

a data processor DPU computing tire force F based on the data on the tire strain obtained from the sensors S; and a tire sensor controller TSC receiving the outputs of the sensors S representing the tire strain, and outputting or forwarding the data on the tire strain towards the main unit of CAVCS in order.

The tire sensor controller TSC comprises an amplifier AMP and a transmitter TR.

As to the amplifier AMP, the analog output of a sensor S is usually very small. Therefore, a linear amplifier is included. If the sensor output is nonlinear, a nonlinear or equalizer amplifier can be used instead. If necessary, an analog to digital converter ADC is included in the amplifier AMP. In the following embodiments, an ADC is included.

The data processor DPU comprises a receiver RE, a processor CPU, a memory MEM, I/O device.

In the following embodiments, the tire force determining system TFDS on each tire is depicted as if each TFDS includes a processor CPU, a memory MEM and the like. But, this is only for the sake of simplicity. For example, it is possible to assign one processor CPU and one memory MEM to TFDS for all the tires. Further, it is also possible to use the processor CPU of the main unit of the CAVCS, e.g. ABS, VSCS and the like.

<Method of Determining the Force>

First, a method of determining the forces is explained. Such method is stored in the memory as a computer program and performed by the processor CPU.

In the above-mentioned zone Y, a tire strain $\in$ caused by a force F is approximately expressed as a linear function of the force F such that $\in=f(F)$.

For example, a tire strain $\in x$ caused by a back-and-forth-direction force Fx is approximately expressed as a linear function of the force Fx such that $$\in x = f(Fx),$$

a tire strain $\in y$ caused by a lateral force Fy is approximately expressed as a linear function of the force Fy such that $$\in x = f(Fy), \text{ and}$$

a tire strain $\in z$ caused by the vertical force Fz is approximately expressed as a linear function of the force Fz such that $$\in x = f(Fz).$$

Accordingly, the tire strain $\in$ caused by a resultant force F of the three translational forces Fx, Fy and Fz can be given as the sum of the strains $\in x$, $\in y$ and $\in z$ and expressed as follow:

$$\in = \in x + \in y + \in z = f(Fx) + f(Fy) + f(Fz)$$

Thus, the values ti (i=1 to 3) of the tire strain $\in$ observed at different measuring points MPi are:

$$t1 = A1*Fx + B1*Fy + C1*Fz$$

$$t2 = A2*Fx + B2*Fy + C2*Fz$$

$$t3 = A3*Fx + B3*Fy + C3*Fz$$

wherein

Ai, Bi and Ci (i=1 to 3) are coefficients at the measuring points MPi (i=1 to 3).

Thus, by solving these simultaneous equations, the unknown variable Fx, Fy and Fz can be obtained.

The simultaneous equations are expressed by the following determinant:

$$\begin{vmatrix} t1 \\ t2 \\ t3 \end{vmatrix} = \begin{vmatrix} A1 & B1 & C1 \\ A2 & B2 & C2 \\ A3 & B3 & C3 \end{vmatrix} \begin{vmatrix} Fx \\ Fy \\ Fz \end{vmatrix}$$

Accordingly, by computing the following determinant $$\begin{vmatrix} Fx \\ Fy \\ Fz \end{vmatrix} = \begin{vmatrix} A1 & B1 & C1 \\ A2 & B2 & C2 \\ A3 & B3 & C3 \end{vmatrix}^{-1} \begin{vmatrix} t1 \\ t2 \\ t3 \end{vmatrix}$$

Fx, Fy and Fz can be easily obtained.

<General Expression>

In general, as explained above, as far as the correlation is substantially linear, a tire strain ti at measuring point MPi (i=1 to m), forces Fj (j=1 to n) to seek and coefficients Kij at a measuring point MPi for the forces Fj are formularized as follows:

$$t1 = K11*F1 + K12*F2 + K13*F3 - - - K1n*Fn$$

$$t2 = K21*F1 + K22*F2 + K23*F3 - - - K2n*Fn$$

$$t3 = K31*F1 + K32*F2 + K33*F3 - - - K3n*Fn$$

$$tn = Kn1*F1 + Kn2*Fn + Kn3*F3 - - - Knn*Fn$$

$$tm = Km1*F1 + Km2*Fn + Km3*F3 - - - Kmn*Fn$$

Thus, the forces F1, F2- - - Fn can be determined from the following determinant.

$$\begin{vmatrix} F1 \\ F2 \\ F3 \\ Fn \end{vmatrix} = \begin{vmatrix} K11 & K12 & K13 & --- & K1n \\ K21 & K22 & K23 & --- & K2n \\ K31 & K32 & K33 & --- & K3n \\ Kn1 & Kn2 & Kn3 & --- & Knn \\ Km1 & Km2 & Km3 & --- & Kmn \end{vmatrix}^{-1} \begin{vmatrix} t1 \\ t2 \\ t3 \\ tn \\ tm \end{vmatrix}$$

<Measuring Point>

The above-mentioned measuring points MP are, as shown in FIG. 1, fixed points on a coordinate system which is bounded to the tire equatorial plane not rotated if the tire rotates. Therefore, when the tire strain is measured with a sensor S fixed to the tire 1, it is necessary to locate the sensor S because the sensor moves around the rotational axis of the tire as the tire rotates.

In general, deformation of a pneumatic tire is larger in a lower half of the tire than an upper half. Therefore, it is preferable that the measuring points are set in a lower half rather than an upper half.

In case that the forces to seek are Fx, Fy and Fz, the measuring points MP are preferably three fixed points as shown in FIG. 14 by dark rectangles: a point MP[0] at the center (0 deg.) of the ground contacting patch, and two symmetric positions MP[90] and MP[270] (90 and 270 deg.) at an angle alpha of 90 degrees from the center (0 deg.). Aside from 90 degrees, the angle alpha may have another values. However, if the measuring points MP at which the sensors S measure the tire strain at a time are too near, the resolution between the forces becomes difficult. Therefore, as shown in FIG. 14, the angle alpha between the adjacent measuring points around the tire rotational axis is at least 30 degrees, preferably at least about 60 degrees (a lower half) but at most 120 degrees (an upper half).

On the other hands, according to the number (n) of the forces to seek, more than three measuring points, for example eight measuring points as shown in FIG. 14 by rectangles (dark rectangles and white rectangles), are possible. In this case, the above-mentioned limitation to the angle alpha is not applied.

The above-mentioned inverse matrix or the coefficients Ai, Bi and Cij (generally Kij) varies depending on the measuring points MP. Therefore, in order to compute the forces Fx, Fy and Fz (generally Fj), it is necessary to obtain and store the coefficients or data thereon beforehand.

<Eight-sensor Arrangement>

As the tire rotates, it is necessary to locate the sensors' positions of the rotating tire, and to read the sensors' outputs at the substantially same moment when the sensors come to the measuring points.

FIG. 15 shows an example of the sensor arrangement on the tire 1, wherein eight sensors S are disposed equiangularly around the tire rotational axis. This sensor arrangement can be combined with the above-mentioned three measuring points MP[0], MP[90] and MP[270] shown in FIG. 14.

<Examples of TFDS>

Firstly, explained is a system designed for such case that the measuring points MP are fixed points, and the number of the sensors S is more than the number (m) of the measuring points MP. The number (n) of the forces Fj is of course not more than the number (m).

FIGS. 16 and 17 each shows a system for determining the translational forces Fx, Fy and Fz for a combination of the eight-sensor arrangement and three measuring point arrangement.

First, the above-mentioned coefficients Ai, Bi and Ci (i=1 to 3) at every measuring point MP[0], MP[90] and MP[270] are determined through measurements, and the date on the coefficients Ai, Bi and Ci are stored in the memory MEM for example in a form usable as the inverse matrix.

The outputs of the sensors S representing tire strain are forwarded through the amplifier AMP, and are encoded/modulated to send out by the transmitter TR.

The transmitted signal is received and decoded/demodulated by the receiver RE, and outputted towards the processor CPU.

AS to the transmitted data, it is possible to send out (1) data of all the sensors S, or alternatively (2) data of selected sensors S positioned at the measuring points MP. In the first case (1), as shown in FIG. 16, the data relating to the measuring points are selected from all the data with a selector SW on the receiving side.

In the latter case (2), as shown in FIG. 17, the data relating to the measuring points are selected from all the data with a selector SW on the transmitting side.

In case that the selector SW selects analog data, the selector SW may be an assembly of semiconductor switches. In case of digital signal, the selector SW may be a set of logical circuits or programmed IC.

In any case, according to data relating to the position of at least one sensor S, the selector SW selects and outputs only the data relating to the relevant measuring points MP as the above-mentioned values ti (i=1 to 3) representing the tire strain ∈.

The data relating to the position of at least one sensor S is provided by a sensor locator SL as the sensor locating data. The sensor locator SL outputs sensor locating data from which the positions of the sensors S can be determined.

In the FIG. 16 example wherein the selector SW is provided on the receiving side (vehicle body side), for example, a rotary encoder connected to the axle of the vehicle can be used.

In case of FIG. 17, the above-mentioned rotary encoder can be used. Further, as shown in FIG. 18 and FIG. 19, it is also possible to employ such novel method that an induction coil COL connected to an oscillator OSL generating a specific frequency fs (for example several hundred herz) is disposed at a point not the measuring points for example at a point MP[180] in FIG. 14. Therefore, when one of the sensors S comes to near the induction coil COL, the sensor S outputs an analog signal including an alternate current of frequency fs although the other sensors do not. Thus, the positions of all the sensors S can be easily located. A band pass filter BP tuned to the frequency fs and connected to each of the sensors' analog signal lines is incorporated in the amplifiers AMP and the band pass filters' outputs are provided for the selector sw as the above-mentioned data relating to the position of at least one sensor S.

Using the date on the tire strain ti, the coefficients Ai, Bi and Ci and so on, the processor CPU computes the forces and outputs data thereon towards the main unit of the CAVCS.

As to the number of the sensors S, in case that the forces to seek are three forces in three translational motion directions, at least three sensors are required to determine the forces. In view of accuracy, however, at least four, preferably at least six, more preferably at least eight sensors S are used.

If the forces to seek are the three forces Fx, Fy and Fz plus three rotational forces Fyz, Fzx and Fxy around the axes x, y and z of the translational motion directions, at least six sensors S are required to determine these six forces. Preferably eight or more sensors are used for accurately determining the forces.

In the above-mentioned examples, the number of the sensors S is more than the number of the forces to seek, and the output data (t) from the sensors are selected with the selector SW, according to the sensor location data (SL), to be decreased to the number of the forces.

In the examples shown in FIG. 20 and FIG. 21, the selector SW, a function to select the sensors at the measuring points, is omitted.

In FIG. 20, the number of the sensors S equals to the number of the measuring points. In this example, the eight sensor arrangement shown in FIG. 15 and the eight measuring point arrangement shown in FIG. 14 are combined.

In this case too, similarly to the former examples, the coefficients (A0-A8, B0-B8 and C0-c8) at each measuring point MP[0], MP[45], MP[90], MP[135], MP[180], MP[225], MP[270] or MP[315] are stored in the memory MEM, and the processor CPU computes the forces Fx, Fy and Fz according to data t1-t8 on the tire strain from the sensors S1-s8, the sensor location data output from the sensor locator SL, and the above-mentioned coefficients.

<Further Example of TFDS>

In the above mentioned examples, the measuring points are fixed points. These measuring points are regarded as one set as the tire strains thereat are measured at a time.

Thus, the intervals at which the computed forces can be obtained is basically determined by the number of the sensors S. If the sensors' number is decreased, as the intervals becomes long, and it becomes difficult to obtain the necessary data in time at high-speed rotation. Contrary, at a slow-speed rotation, a time period for which the computation of the forces is impossible becomes long. When eight sensors are disposed equiangularly, the computed forces are obtained every 45 degrees. Although, the intervals can be shortened by increasing the number of the sensors S, the increasing of the sensors S is not preferable. Thus, the number is usually at most 16, and at least 4 preferably 8.

The following is a method for shortening the intervals without increasing the number of the sensors.

The intervals can be shortened by increasing the number of measuring points MP and use different sets of measuring points as the tire rotates. In other words, the measuring points at which the sensors measure the tire strain are changed as the tire rotates.

FIG. 21 shows a system designed for such case that the number (m) of the measuring points MP is more than the number of the sensors S.

In this embodiment, the forces to seek are Fx, Fy and Fz, and eight sensors S1-S8 are disposed equiangularly.

The number of the measuring points is very large, for example, 360. In other words, the measuring points are provided around the rotational axis every 1 degree.

The output data t1-t8 of all the sensors S1-s8 are transmitted to the processor CPU through the amplifiers AMP, the transmitter TR, receiver RE, etc.

The sensor locator SL outputs data from which the positions of the sensors S can be determined. For example, the selector sw is a rotary encoder connected to the axle of the vehicle. According to the output data of the sensor locator SL, the processor CPU reads the memory for the stored data on the coefficients at the located measuring points and, using those data, the CPU computes the forces Fx, Fy and Fz.

Thus, in this embodiment, the forces can be obtained every 1 degree of tire rotation.

In this embodiment however, the record data size of the coefficients Kij becomes large because eight coefficients K(1-360)(1-8) are necessary per each of the 360 measuring points MP[0]-MP[359]. Thus, it is preferred that the record data size is decreased as follows.

For example, the tire strain in an upper half of the tire is not so significant for the forces Fx, Fy and Fz. Therefore, the measuring points can be provided in only a lower half. Thus, the number and size are decreased to one half. In this case, since four sensors S still exist in the lower half, accurate analysis is possible every 1 degree rotation.

<Linear Interpolation>

Further, without changing the intervals (in this example ever 1 degree), the record data size can be further decreased by the following method. This method can be adopted regardless of whether the area of the measuring points is a lower half, namely, whether partial or full. The measuring points (for example every 1 degree) are not changed, but the stored coefficients K are decreased to for example every 2 or more degrees, and coefficients at missing measuring points are generated by, for example, a linear interpolation as follows.

Given that K[θl] is the coefficient at a missing measuring position MP[θl], K[θk] is the coefficient at an adjacent measuring position MP[θk] stored, K[θm] is the coefficient at an adjacent measuring position MP[θm] stored, and θ is an angle, for example, based on the center of the ground contacting patch being zero (θk<θl<θm), K[θl] is determined as follows:

$$K[\theta l]=K[\theta k]*(\theta m-\theta l)/(\theta m-\theta k)+ K[\theta m]*(\theta l-\theta k)/(\theta m-\theta k)$$

Thereby, the data can be reduced to 50% to about 20%.

<Method of Obtaining Coefficients>

As to the coefficients, the coefficients at each measuring point are determined through tire loading tests as follows. The tire is mounted on the wheel rim and inflated to a normal or standard pressure. Applying a specific tire force such as Fx, Fy, Fz in turn and changing the magnitude thereof, the tire strain is actually measured with the sensors S, and the coefficients are determined through analyzing of the sensors' outputs. More specifically, by making a regression analysis, taking the forces (Fx, Fy, Fz) as independent variables and the sensor outputs (t1 to t3) as dependent variables, the coefficients (A1-A3, B1-B3, C1-C3) can be obtained as the regression coefficients. The coefficients are stored in the memory MEM.

<DC Power>

As to the electric power for the sensors S, amplifiers AMP, transmitter TR and so forth provided on the tire side, a combination of a wireless power transmit system, for example utilizing electromagnetic induction, electromagnetic wave or the like, and an electric accumulator is preferred for ease of maintenance or maintenance free. However, if the required total power is large, the electric power can be supplied through a power transmission unit utilizing physical contact between electric conductors such as slip ring unit. In this case, in order to send the sensor data from the vehicle wheels (tires) to the vehicle body, the same physical contact type power transmission unit can be used.

More specifically, the transmitter TR generates a carrier wave modulated by the sensor data and superposes the modulated carrier wave on the DC power. The modulated carrier wave is split off from the DC power and demodulated into the sensor data by the receiver RE.

<Mounting Position of Tire Sensor Controller>

The tire sensor controller TSC is fixed to the tire 1 as shown in FIGS. 10 and 12 or wheel rim 17 as shown in FIG. 11 using adhesive agent, bracket and the like. In view of tire performance and characteristics, it is preferable that the controller TSC is fixed in the wheel rim well, or to the inner surface of the vulcanized tire at a position near the bottom of the bead portion 4. But it may be also possible to fix to another part as far as the part rotates together with the tire and wheel. In any case, in particular FIGS. 10 and 11 cases, the lead wires 16 between the strain sensors S and tire sensor controller TSC are preferably embedded in tire rubber before tire vulcanization.

The invention claimed is:

1. A system for determining the magnitude of a force acting on a tire, comprising
   the tire,
   a tire strain sensor mounted on the tire, for detecting a tire strain at the mounted position, and generating data representing the tire strain, wherein said mounted position is a fixed position on the tire,
   a sensor locator for locating the sensor on the tire while the tire rotates together with the sensor,
   a memory in which data on relationships between the tire strain and force acting on the tire at each of measuring points are stored, and
   a processor computing the magnitude of the force, using the data representing the tire strain obtained from the tire strain sensor and the data on the relationships acquired from the memory based on the data on the sensor location obtained from the sensor locator, whereby the magnitude of the force acting on the tire is determined by utilizing the tire strain caused by the force.

2. The system according to claim 1, wherein said mounted position is a position where the force and resultant tire strain have a substantially linear correlation.

3. The system according to claim 2, wherein said mounted position is in the sidewall portion of the tire.

4. The system according to claim 1, wherein said tire sensor is disposed in each of circumferentially different positions, and the number of the sensors is at least three.

5. The system according to claim 4, wherein the number of the strain sensors is at least six.

6. The system according to claim 5, wherein
   said force is a force in each of three translational motion directions, and
   the processor computes the magnitude of each force, using the data representing tire strains obtained from the tire strain sensors and the data on the relationships acquired from the memory based on the data on the sensor locations obtained from the sensor locator.

7. The system according to claim 1, wherein the strain sensor has a directivity and is mounted so that the directivity inclines with respect to the tire radial direction.

8. The system according to claim 1, wherein the strain sensor comprises at least one magnet and at least one magnetometric sensor embedded in a resilient material.

9. The system according to claim 1 or 8, wherein the strain sensor has the most sensitive direction, and the most sensitive direction is inclined at an angle of from 10 to 80 degrees with respect to the tire radial direction.

10. A method of determining the magnitude of a force acting on a tire, comprising
    obtaining data on a tire strain from a tire strain sensor mounted on the tire,
    locating the tire strain sensor, to obtain data on the position of the tire strain sensor,
    obtaining data on relationships between the tire strain and force at the located position of the tire strain sensor, from previously stored data on relationships between the tire strain and force at a plurality of positions, and
    computing the force using the obtained data on the tire strain and the obtained data on the relationships between the tire strain and the force.

11. The method according to claim 10, wherein
    at least three tire strain sensors are disposed circumferentially of the tire, and
    in the process of obtaining the data on the tire strain, the data are obtained from each of three or more of said at least three tire strain sensors,
    in the process of locating the tire strain sensor, data on the position of each said three or more of the tire strain sensors are obtained,
    in the process of obtaining the data on the relationships between the tire strain and the force, the relationships for each of said three or more of the tire strain sensors are obtained,
    in the process of computing the force, at least three forces are computed, using the obtained data on the tire strains and the obtained data on the relationships.

* * * * *